(12) United States Patent
Zahradnik

(10) Patent No.: US 7,513,039 B2
(45) Date of Patent: Apr. 7, 2009

(54) METHOD OF MAKING A DOUBLE-SCREW EXTRUDER

(75) Inventor: Rudolf Zahradnik, Mistelbach (AT)

(73) Assignee: Theysohn Extrusionstechnik Gesellschaft m.b.H., Korneuburg (AT)

( * ) Notice: Subject to any disclaimer, the term of this patent is extended or adjusted under 35 U.S.C. 154(b) by 602 days.

(21) Appl. No.: 11/141,911

(22) Filed: Jun. 1, 2005

(65) Prior Publication Data

US 2006/0007776 A1    Jan. 12, 2006

(30) Foreign Application Priority Data

Jul. 8, 2004    (AT) .............................. A 1160/2004

(51) Int. Cl.
  *B23P 11/00*    (2006.01)
  *B23P 19/04*    (2006.01)
  *B29B 7/80*    (2006.01)
(52) U.S. Cl. ..................... 29/888.06; 29/460; 366/69
(58) Field of Classification Search ............... 29/460, 29/888.06, 557; 366/69, 84, 85, 334, 335; 384/282; 428/683; 164/38
See application file for complete search history.

(56) References Cited

U.S. PATENT DOCUMENTS

| 4,036,540 | A | 7/1977 | Seufert ..................... 308/239 |
| 5,093,209 | A | 3/1992 | Kroisenbrunner ........... 428/683 |
| 5,752,770 | A | 5/1998 | Kawaguchi et al. |
| 6,997,235 | B2 | 2/2006 | Zellerohr ................... 164/138 |

FOREIGN PATENT DOCUMENTS

| DE | 29913316 | 12/1999 |
| GB | 1326031 | 8/1973 |
| JP | 04344218 | 11/1992 |
| JP | 04368834 | 12/1992 |

*Primary Examiner*—John C Hong
(74) *Attorney, Agent, or Firm*—Andrew Wilford

(57) ABSTRACT

To form the housing of a double-screw extrude, the housing body or a segment thereof is provided with auxiliary bores along a segment of the housing at which the hardening material is to be thicker or a hardening material is to be provided. The screw-receiving bores are then formed and overlap each other and the auxiliary bores and the hardening material is provided at least in the auxiliary bores by a division process, preferably a hot isostatic pressing (HIP) process.

13 Claims, 2 Drawing Sheets

METHOD OF MAKING A DOUBLE-SCREW EXTRUDER

FIELD OF THE INVENTION

My present invention relates to a method of making a housing or housing segment for a double-screw extruder of the type having a pair of overlapping or intersecting screw-receiving bores with hardening of the metal of the housing or housing segment radially outwardly of the bore and with a thicker hardened layer over selected segments around each bore. The invention also relates to a double-screw extruder housing or housing segment which is made by the improved method.

BACKGROUND OF THE INVENTION

Double-screw extruders and their housing are well known in the extruder art and are used to prepare and advance materials to be extruded through a die by rotation of the extruder screws in respective screw-receiving bores which can extend substantially over the length of the housing or a housing segment.

The term "housing segment" is here used to refer to an axially-extending portion of an extruder housing which can be joined to other such portions in axial alignment to form the entire housing. In other words the housing may be a one-piece housing whose bores extend over substantially the entire length of the extruder or a housing assembled from a plurality of such housing segments which can be joined together with screws. For this purpose, each segment can have a flange at an end thereof which is secured to the flange of another such segment or some other housing part by means of screws connecting the adjoining flanges together.

It is common to harden the wall of the screw-receiving bore in such housing or housing segment at least over high-wear segments of such walls. The hardening may be achieved by case hardening, nitriding, heat treatment or the like to an appropriate depth, i.e. radially outwardly of the bore.

When reference is made to the "housing" here, it is intended to thereby refer to the entire housing, e.g. a one-piece housing, or to a housing segment capable of being joined to other such segments to form the housing, unless the context indicates otherwise.

The housing of a double-screw extruder can be composed for example of heat-treatable nitride steel. Following the machining of the housing to form the screw-receiving bores to their final dimensions, the housing is usually subjected to heat treatment to the desired hardening level and thus to provide the requisite wear-resistant property.

With such double-screw extruder housings, this method has been found to be disadvantageous since, even with wear to a depth of only about 0.1 mm, the nitride hardening layer is consumed and the wear of the softer material therebelow can proceed significantly more rapidly. Such a housing or housing segment can no longer be regenerated and must be replaced.

One technique for overcoming this problem is to make the extruder housing with larger screw-receiving bores than is necessary to accommodate the screw. Then lining sleeves with a thickness of say 10 mm can then be inserted into the bores and can be composed of a wear-resistant material. When these sleeves are worn, they can be replaced. However, problems are then encountered with heat transfer since there is a resistance to thermal conduction between the lining sleeve and the housing since the sleeves are only pressed into the housing.

Different hardening methods have been described in the literature. For example, DE 10 048 870 C2 describes the introduction into the screw-receiving bores of a solid or hollow core and the filling of the space between the core and the housing with a metal/carbide powder mixture and the bonding of the particles of this mixture together and to the housing by a HIP process (Hot-Isostatic Pressing). In the HIP process, the HIP material in pulverulent form is compacted at a pressure in excess of 1000 bar and at a temperature upwards of about 1250° C. The hot isostatic pressing technique requires a metal housing which is welded to a hermetic seal which can be sustained even at such high temperatures. The metal capsule is filled and highly evacuated. The materials used can be metal alloys employed in powder metallurgy and whose alloy content will not support the loss of solubility and the phase diagrams. The material which is produced has the hardened or hardening layer and is free from segregations and has a fine-grained isotropic microcrystalline structure.

Metal/carbide powder mixtures and similar materials are relatively expensive and with this earlier process, it can be a drawback that the entire surface of each screw-receiving bore must be covered with the relatively expensive material.

A housing of the type described at the outset for a double-screw extruder has been described also in DE 29 913 216 U1 (see especially FIG. 5 thereof). This reference describes the concept of providing the wear-resistant materials only over a certain angular sector of each bore, i.e. in the region at which greatest wear can be expected. In a standard double-screw extruder, these regions can be the regions from 10 to 12 o'clock for the left screw-receiving bore as seen in cross section and the region from the 12 o'clock to 2 o'clock positions for the right-hand screw.

The wear-resistant material is in that case in the form of an insert which is set into the wall of the bore.

U.S. Pat. No. 5,752,770 describes the joining of a wear-resistant layer over part of the periphery of a bore with the remaining bore at a shoulder or junction.

With these earlier systems, there can be difficulties in fabricating the housing. For example, in DE 299 13 316 U1, the insert pieces are fabricated separately and are fastened in grooves of the housing by clamping screws. The fabrication of grooves over the length of the extruder-housing is also a problem as is the fastening of the inserts where they will be exposed to high forces. In U.S. Pat. No. 5,752,770, welding has been proposed and even that cannot be used with assurance since relatively thin and long bores for the extruder screws frequently will not permit welding to be used.

OBJECTS OF THE INVENTION

It is, therefore, the principal object of the present invention to provide an improved method of making a double-screw extruder housing whereby the advantages of selective hardening with thicker and thinner regions can be obtained but without the drawbacks of the earlier systems.

A more specific object of the invention is to provide an improved double-screw extruder housing which has increased wear resistance, which can be fabricated in a simpler more economical manner and which can afford advantages with respect to the cost and ease of fabrication, reliability and convenience.

Still another object of this invention is to provide an improved double-screw extruder housing which has advantages over prior art systems.

SUMMARY OF THE INVENTION

These objects are achieved in accordance with the invention in a method of making a double-screw extruder housing comprising the steps of:

(a) providing in a solid cross section of a body adapted ultimately to form at least an axial segment of the housing and at segments corresponding to radially thicker portions of hardened material in the housing, respective pluralities of axial auxiliary bores;

(b) thereafter providing in the body respective screw-receiving bores each intersecting a respective plurality of the auxiliary bores; and (c) applying to the body at regions of the screw-receiving bores hardening layers whereby hardening material fills the auxiliary bores to provide radially thicker portions of hardened material at the auxiliary bores.

The hardening layers can be applied to the wall of the screw-receiving bores by diffusion bonding and especially by hot-isostatic pressing. The body which is provided with the hardening layers can be the housing itself or an axial segment of the housing which can be joined to at least one other axial segment to form the housing by a bolting method. The method in step (c) can have cores inserted into the screw-receiving bores, the hardening layers being formed between the cores and the body. The cores can be tubular and/or drilled out after formation of the layers. The cores can, alternatively, be coated with antibonding coatings or layers which do not bond to the hardening layers before they are inserted into the screw-receiving bores so that the cores can be withdrawn from the body after forming of the hardening layer. The coatings can be ceramic.

The material for the hardening layers can, especially in the case of hot-isostatic pressing, be introduced in the form of powder although it can be introduced as a solid member as well. It has been found to be advantageous, further to form the auxiliary bores of each plurality of groups of such bores so that the auxiliary bores will intersect one another. The auxiliary bores can be filled with the material of the hardening layer before the screw-receiving bores are formed in the body or can be filled with the material of the hardening layer when the hardening layer is applied to the wall of the screw-receiving bore. The double screw-extruder housing or housing segment made by that method is also part of the invention and there the auxiliary bores can extend over a 12 o'clock to 2 o'clock segment of one bore and over a 10 o'clock to 12 o'clock segment of the other.

With the method of the invention, therefore, initially in solid cross section of the housing or housing segment, the auxiliary bores are formed and which will lie along the edges of each screw bore and preferably will overlap or intersect it. Thereafter, the screw bores are formed in the housing or segment and the hardening layer is applied in the region of the auxiliary bores, advantageously by diffusion bonding and especially by the HIP process.

By contrast with earlier systems, therefore, one does not begin with the formation of the screw bores and then provide recesses therein but instead one begins by initially forming the auxiliary bores at such locations that they will lie along the periphery of the screw-receiving bores and such that the auxiliary bores will automatically form recesses in walls of the screw bores to receive the hardening layer or the material forming the hardening layer by the diffusion bonding and especially HIP.

Although reference is made herein to auxiliary bores, it should be noted that these bores need not be made by a drilling or boring process but can be formed by milling or some other process in the solid body of the housing or housing segment. Furthermore, they need not extend through the entire housing or housing segment when the hardened layer is sufficient only over a limited axial length of the housing or housing segment.

Preferably the functional layer, i.e. the hardening material, is formed in the auxiliary bore before the screw-receiving bores are formed in the body or segment.

In this case, initially the auxiliary bores are formed in the solid body or segment and the HIP material is introduced into these bores and solidified by the HIP process. Then the screw-receiving bores are formed in the housing or segment, preferably to intersect the auxiliary bore. Naturally it is advantageous to provide the screw-receiving bores before the HIP material has reached its full hardness. Otherwise there is the danger that the boring tool will be deflected by the hardened material. This can be avoided if the screw bore is to be formed after full hardening of the HIP material by providing pilot bores for guiding the boring tools or draw boring screw-receiving bores through the pilot bores.

As an alternative thereto it is however possible to form the auxiliary bores and the screw-receiving bores and to insert a core into the screw-receiving bores. The hardened layer can then be formed between the core and the housing or the housing segment. When the core is fitted snugly in the screw-receiving bores, the hardened material is confined to the region of the auxiliary bores. When the diameter of the core is somewhat less than the diameter of the screw-receiving bore, the gap between the two can be filled with the hardening material which can provide a lining of the hardening material over the entire wall of each screw-receiving bore but with a thickness of the hardening material which is greater in the region of the auxiliary bores.

It is advantageous to provide a core which is tubular since this requires less material for producing the core. When a so-called lost core is provided, the core can be drilled out in its entirety in a highly advantageous embodiment of the invention.

It is however also possible to coat the core with, for example, a ceramic before it is inserted into the screw-receiving bore and to withdraw the coated core after the HIP process has hardened the material lining the screw-receiving bores. The core coating does not bond to the hardening layer and if it is damaged in the withdrawal of the core, poses no problem since the core can be recoated for the next use.

BRIEF DESCRIPTION OF THE DRAWING

The above and other objects, features, and advantages will become more readily apparent from the following description, reference being made to the accompanying drawing in which.

SPECIFIC DESCRIPTION

A double-screw extruder, in accordance with the invention, has an elongated housing which, in the auxiliary direction, can be treated as having segments in which different functions are carried out. These segments may or may not be separable from one another or constituted by separate bodies. The functionally distinct segments are typically the compression zone, a decompression zone and a metering zone. In the compression zone, considerable wear may occur. In the decompression zone, which serves for degassing of, for example a synthetic resin composition, the wear is significantly lower. In the metering zone, which terminates at an extrusion nozzle, the wear may be again considerable. The present invention is applicable wherever, along the extruder housing, regions of higher wear can arise. The segments into which the extruder housing may be physically divided, can correspond to these functional segments or can be different, i.e. of greater or lesser length than the functional segments. Where the housing is subdivided into a number of housing bodies, each of these bodies or segments maybe flanged at its ends and connected to a flanged end of an adjoining segment by bolts through the neighboring segments.

Figure 1:
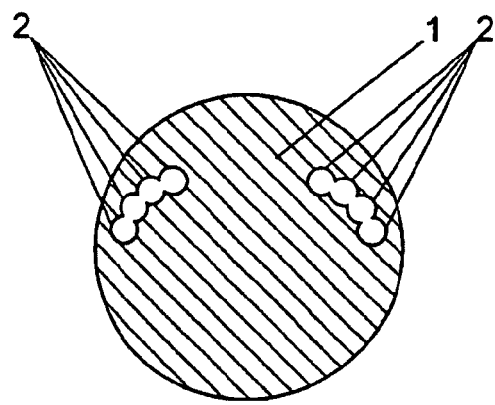
FIG. 1 is a diagrammatic cross section through a double screw-extruder housing or housing segment Provided with auxiliary bores prior to the introduction of the hardening material and the formation of the screw-receiving bores.

In a housing segment 1 (FIG. 1), for example the metering zone, the body can be composed of a nitride steel and in accordance with the invention is provided initially with auxiliary bores 2. These auxiliary bores 2 overlap, i.e. intersect, and are provided over a segment which corresponds to the future edge or periphery of the respective screw-receiving bores. The axial bores 2 can extend through the body or can terminate short of the length of the body, that is the end, and need not extend over the entire length of the housing segment 1. In the case of the metering zone, the auxiliary bores 2 can be drilled from the end of the housing to which the extrusion nozzle will be later applied and can terminate prior to the opposite end of the segment at which the decompression zone adjoins the metering zone.

Figure 2:
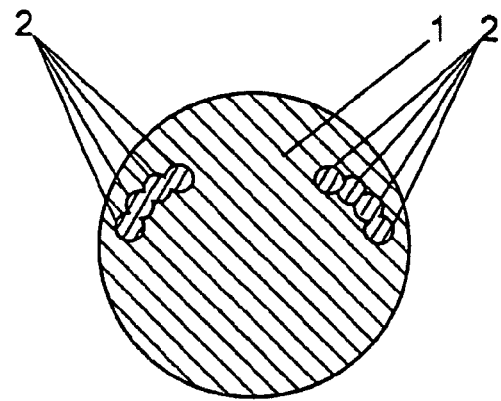
FIG. 2 shows the body of FIG. 1 after the introduction of the hardening material.
Figure 3:
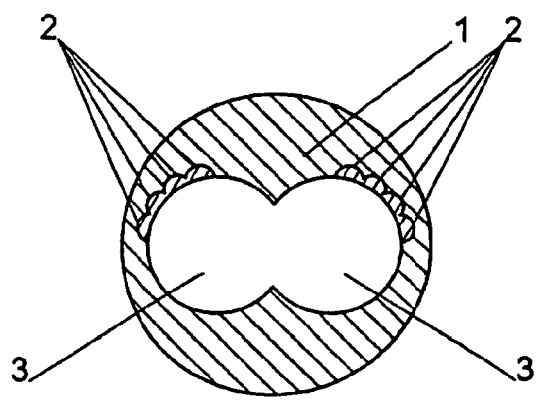
FIG. 3 is a cross section similar to FIGS. 1 and 2 after formation of the screw-receiving bores.

The auxiliary bores 2 are filled with an HIP material, for example a carbon steel, carbide powder or the like (FIG. 2) and a HIP process is carried out. While the carbon steel is still soft, the screw-receiving bores 3 are formed in the body (FIG. 3) and in a subsequent heat treatment the carbon steel is hardened. FIG. 3 shows the completed housing segment.

Figure 4:
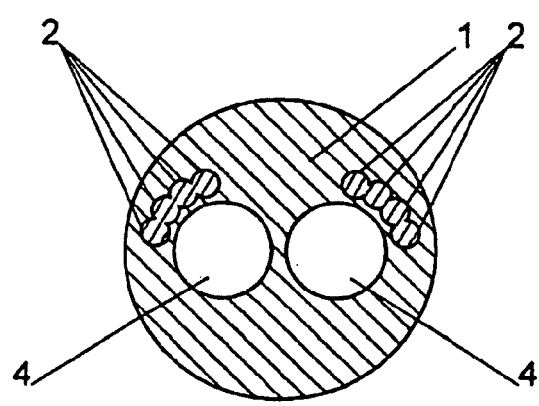
FIG. 4 is a similar cross section showing pilot bores formed in the body prior to the formation of the screw-receiving bores of FIG. 3.

If the material in the auxiliary bores 2 has a significantly greater hardness than that of the surrounding material such that the formation of the bore 3 to their final diameters cannot be carried out without deflection of the boring tool, pilot bores 4 can be formed (FIG. 4) of a smaller diameter and the final bores 3 can then be made by draw-boring tools.

If carbide-coated screws or worms are used, hardening coating of the wall of the bore may be desired. In this case both the auxiliary bores 2 and then the screw-receiving bores 3 are formed (FIG. 5), a core 5, 5' can be inserted into each bore 3 and the hardening material can be provided in the halves of the bores 2 which are open into the bores 3 (FIG. 6). The HIP process follows to harden the material in the auxiliary bores.

If the cores 5, 5' are ceramic coated, they can be then withdrawn from the housing body 1 leaving the configuration shown in FIG. 3.

However, if the cores 5, 5' cannot be withdrawn, they must be drilled out without damage to the hard material in the auxiliary bores 2.

Figure 5:
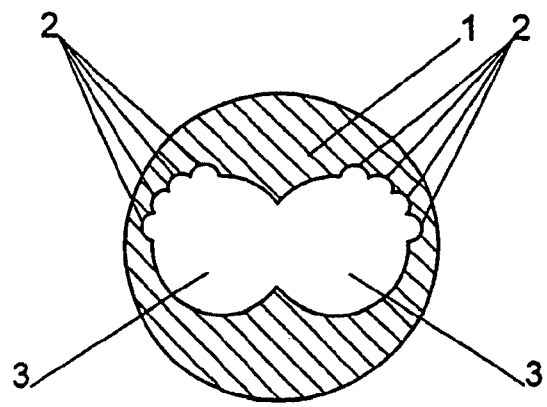
FIGS. 5 and 6 are cross sectional views illustrating another embodiment of the invention.
Figure 6:
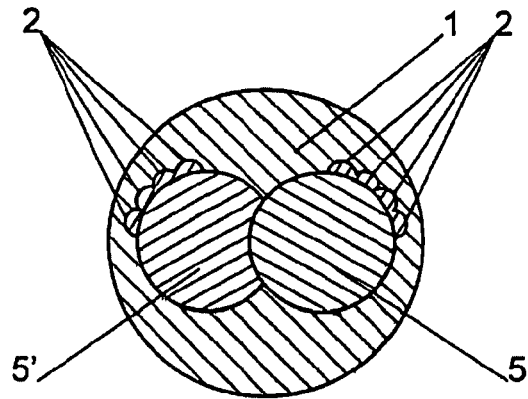
Figure 7:
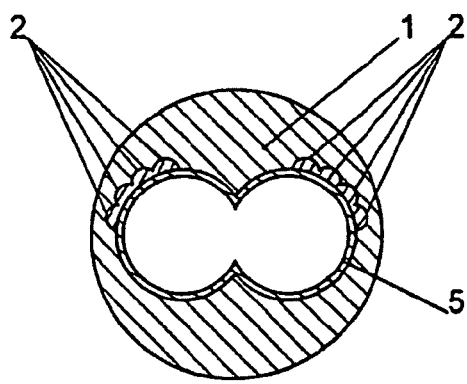
FIGS. 7 and 8 are similar cross sectional views illustrating still another embodiment.

Alternatively, the cores can be tubular as shown in FIG. 5, thereby facilitating drilling out or removal in some other manner.

Figure 8:
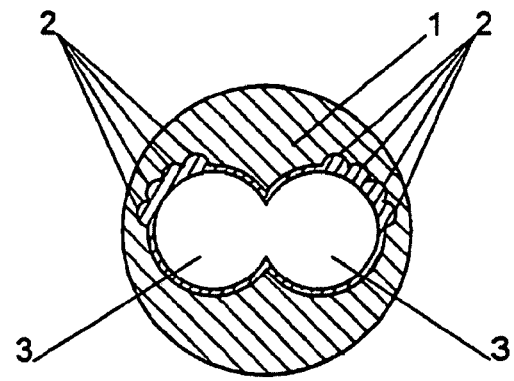

FIG. 8 shows a housing made with the aid of cores having is a smaller diameter than that of the bores 3 so that a layer of the hardening material can line the entire wall of each bore 3 and form in one piece with hardening material in the bores 2 during the HIP process. In this case while the hardening material completely lines the bores 3, it will be thicker in the region of the grooves or plurality of bores 2.

I claim:

1. A method of making a double-screw extruder housing comprising the steps of:
   (a) providing in a solid cross section of a body adapted ultimately to form at least a portion of said housing, respective pluralities of axial auxiliary bores;
   (b) thereafter forming in said body respective screw-receiving bores each intersecting a respective plurality of said auxiliary bores; and
   (c) applying to said body in said screw-receiving bores hardening layers that fill said auxiliary bores to provide radially thicker portions of hardened material at said auxiliary bores.

2. The method defined in claim 1 wherein said hardening layers are applied to walls of said screw-receiving bores by diffusion bonding.

3. The method defined in claim 2 wherein said hardening layers are applied to said walls of said screw-receiving bores by hot isostatic pressing.

4. The method defined in claim 3 wherein said body is a one-piece body forming the housing.

5. The method defined in claim 1 wherein in step c) cores are inserted into said screw-receiving bores and said hardening layers are formed between the cores and said body.

6. The method defined in claim 5 wherein said cores are tubular.

7. The method defined in claim 5, further comprising the step of drilling out the cores after formation of said layers.

8. The method defined in claim 5, further comprising the steps of
   coating said cores with layers which do not bond to the hardening layers before said cores are inserted into the screw-receiving bores, and
   withdrawing said cores from said body after forming of said hardening layers.

9. The method defined in claim 8 wherein said hardening layers are formed by hot isostatic pressing and said layers coated onto said cores are ceramic.

10. The method defined in claim 9 wherein the material for said hardening layers is introduced in the form of a powder or as a solid member.

11. The method defined in claim 1 wherein said auxiliary bores of each of said pluralities intersect one another.

12. The method defined in claim 1 wherein said auxiliary bores are filled with the material of said hardening layers before said screw-receiving bores are bored in said body.

13. The method defined in claim 1 wherein said auxiliary bores are filled with material of said hardening layers when said hardening layers are applied to walls of said screw-receiving bores.

* * * * *